(12) United States Patent  
Zelinski

(10) Patent No.: US 6,917,709 B2
(45) Date of Patent: * Jul. 12, 2005

(54) AUTOMATED SEARCH ON CURSIVE RECORDS NOT HAVING AN ASCII INDEX

(75) Inventor: Pavel Zelinski, Boulder, CO (US)

(73) Assignee: Parascript LLC, Boulder, CO (US)

( * ) Notice: Subject to any disclaimer, the term of this patent is extended or adjusted under 35 U.S.C. 154(b) by 53 days.

This patent is subject to a terminal disclaimer.

(21) Appl. No.: 10/321,099

(22) Filed: Dec. 16, 2002

(65) Prior Publication Data

US 2003/0099399 A1 May 29, 2003

Related U.S. Application Data

(63) Continuation of application No. 09/357,475, filed on Jul. 20, 1999, now Pat. No. 6,501,855.

(51) Int. Cl.[7] ................................................. G06K 9/18
(52) U.S. Cl. ...................... 382/186; 382/179; 382/218; 382/306; 707/6
(58) Field of Search .................. 382/119–123, 155–161, 382/179, 186, 217, 218, 305, 306; 707/3, 6

(56) References Cited

U.S. PATENT DOCUMENTS

| | | | |
|---|---|---|---|
| 4,991,087 A | * | 2/1991 | Burkowski et al. ............. 707/3 |
| 5,091,975 A | | 2/1992 | Berger et al. .................. 382/56 |
| 5,115,479 A | | 5/1992 | Murayama .................... 382/56 |
| 5,253,336 A | | 10/1993 | Yamada ....................... 395/142 |
| 5,309,521 A | | 5/1994 | Matsukawa ................... 382/22 |
| 5,313,527 A | | 5/1994 | Guberman et al. ........... 382/13 |
| 5,325,477 A | | 6/1994 | Klassen ....................... 395/142 |
| 5,467,407 A | | 11/1995 | Guberman et al. ......... 382/186 |
| 5,473,742 A | | 12/1995 | Polyakov et al. ........... 395/142 |

* cited by examiner

*Primary Examiner*—Samir Ahmed
*Assistant Examiner*—Anand Bhatnagar
(74) *Attorney, Agent, or Firm*—Merchant & Gould P.C.

(57) ABSTRACT

Images of handwritten cursive records are extracted, and an automated search on the images of the cursive records is performed based on an ASCII query for a record. A cursive equivalent of the ASCII query is matched to the images of the cursive records, and a similarity value is generated to indicate the extent of match between features of the cursive equivalent of the ASCII query and features of each cursive record. The records are sorted based upon their similarity value determined in the matching process. This provides a candidate list of cursive record images to be manually examined by a user for the purpose of making a final determination as to whether any of the cursive records on the candidate list satisfy the query.

8 Claims, 9 Drawing Sheets

| NN | FEATURES | SNIPPET | LINK TO DOC |
|---|---|---|---|
| 1 | METASTROKES$_1$ | *Nabo ........ Joe ......* | DOC ID = $n_1$<br>ZONE=$x_1,y_1,dx_1,dy_1$ |
| 2 | METASTROKES$_2$ | *Biffle George* | DOC ID = $n_2$<br>ZONE=$x_2,y_2,dx_2,dy_2$ |
| 3 | METASTROKES$_3$ | *Bird John* | DOC ID = $n_3$<br>ZONE=$x_3,y_3,dx_3,dy_3$ |
| ... | ... | ... | ... |

FIG.3

1ST CHOICE LIST $A_1^2$  $S_1^2$ $A_1^4$  $S_1^4$ $\vdots$ $A_1^X$  $S_1^X$

AUTOMATED SEARCH ON CURSIVE RECORDS NOT HAVING AN ASCII INDEX

RELATED APPLICATIONS

This continuation application claims the benefit of priority of U.S. application Ser. No. 09/357,475, filed Jul. 20, 1999 now U.S. Pat. No. 6,501,855.

FIELD OF THE INVENTION

This invention relates to an automated search system for searching handwritten cursive records to restrict the number of documents containing these records that require a manual search. In particular, the invention relates to an automated search of a cursive written name, word or phrase in handwritten documents to assist a user in locating candidates for manual review where the candidates may be a match for a query defined name, word or phrase.

BACKGROUND OF THE INVENTION

With the advent of high speed information processing systems, it is now possible to process large databases built from information originally collected on paper documents. If these documents are printed documents, automated character recognition systems have been developed that have a high probability of correctly reading printed data and converting that printed data into ASCII codes usable by the computing system. A problem arises where the characters on the documents are handwritten cursive characters.

Character recognition systems designed to recognize handwritten cursive characters are well known and have been under development now for at least three decades. At this point, one can expect a handwriting recognition system to read approximately 50% of the cursive words whose images are scanned into the computing system. The unrecognizable words must be manually examined and keyed into the computing system by operators. For low volume systems handling a few hundred documents a day, this is not a problem. However, for large database systems dealing with hundreds of millions of documents, the manual examination of the documents followed by key entry of the information on those documents is not an acceptable alternative.

For example, in a database system maintaining genealogical records, it would be desirable to be able to scan images of census records and read the individual names on these records. Most of these census documents contain handwritten cursive records. Billions of documents have been collected over many centuries of keeping such records around the world. If, for example, there are documents containing two billion handwritten cursive census records, and if manually reading and keying in records can be done at the rate of two million records a year, it would take one thousand years to manually enter all of the handwritten cursive record information on these documents. Even applying the best cursive character recognition technology available at this time, which is 50% successful, the number of records to be manually entered is only cut in half. To complete the task of manually entering these records into the computing system, the number of years in this example is reduced only from one thousand years to five hundred years.

SUMMARY OF THE INVENTION

In accordance with this invention, the above and other problems have been solved by extracting images of the cursive records, performing an automated search on the images of the cursive records based on an ASCII query for a record, and matching a cursive equivalent of the ASCII query to the images of the cursive records. A similarity value is generated indicating the extent of match between features of the cursive equivalent of the ASCII query and features of each cursive record. Finally, the records are sorted based upon their similarity value in the matching process to provide a candidate list of cursive record images to be manually examined by a user for the purpose of making a final determination as to whether any of the cursive records on the candidate list satisfy the query.

The foregoing and other features and advantages of the invention will be apparent from the following more particular description of preferred embodiments of the invention as illustrated in the accompanying drawings.

BRIEF DESCRIPTION OF THE DRAWINGS

FIG. 3 is an illustration showing the snippet image and data stored for each of three cursive records (snippets).

DETAILED DESCRIPTION OF PREFERRED EMBODIMENTS

Figure 1:
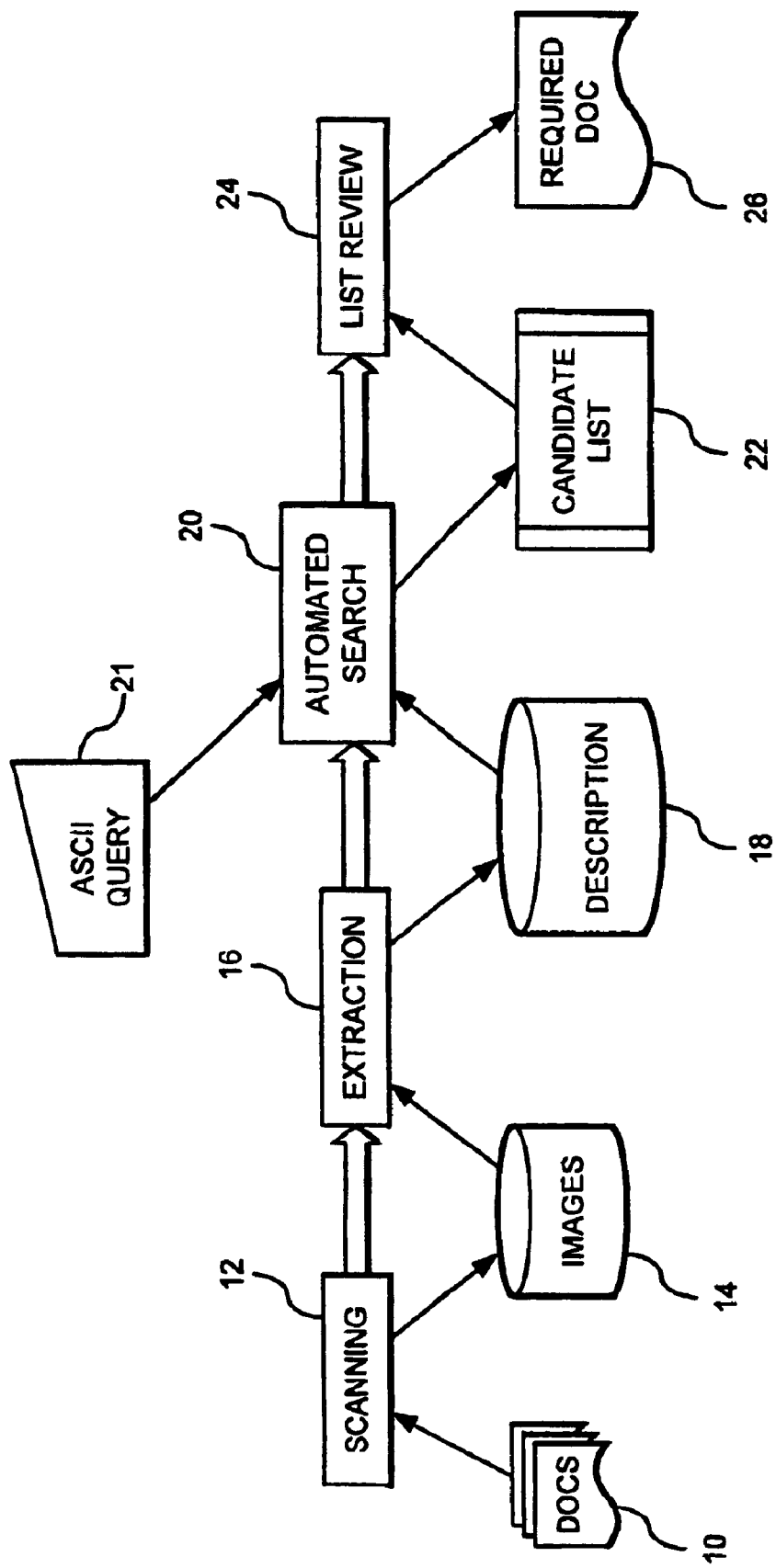
FIG. 1 shows a preferred embodiment of the primary logical operations making up the invention.

In FIG. 1, the documents containing handwritten or cursive text are scanned into the system by scanning operation 12. Scanning operation 12 stores a complete image of each document in document images data 14. Extraction operation 16 retrieves the document images data and processes the document images data to collect document information. The document information includes the type of document, a link between the document and the document image, and record image location on the document. The type of document might be a record document containing only one record or snippet. A "snippet" as used herein shall mean a word or a series of words making up a phrase or name, such as an individual's name (partial or full).

More typically, a record document contains multiple records or snippets for a plurality of names, some examples including census records, birth and death records, membership records, inventory records, accounting records, etc. Also the document type might vary in form by source of document—for example, a census document in Texas being different in form from a census document in Ohio. Identifying the type of document assists in locating records or snippets on the document. Snippet or record location is the X (horizontal) and Y (vertical) location of the snippet or record on the document.

Extraction operation 16 preprocesses the document image and extracts various pieces of information relative to each snippet on the document. Such extracted information includes a cursive snippet or record image and features of the image in the snippet image. In one embodiment these features are cursive character stroke features that make up a handwritten cursive character. The extracted information along with a link to the document is then stored by extraction operation 16 as snippet description data 18.

Automated search operation 20 receives the snippet description data 18 for all snippets, and the ASCII query "Q" from a user for a requested snippet or search text. The automated search operation 20 compares the cursive features in the snippet description filed for all snippets from the documents against the cursive features of the snippet or search text in the ASCII query. Operation 20 generates an ordered candidate list 22. The candidate list is a list of best guesses of matches between the cursive search text images for the ASCII query and the cursive record image in the snippet description data. The candidate list 22 is ordered by similarity value where the similarity value indicates or is a measure of the degree of match between the query and each actual snippet or record as described in snippet description data 18.

List review operation 24 then provides an interactive interface between the user and the automated search system to allow a user or investigator to examine actual snippet images on the candidate list 22. The user proceeds through the candidate list which is now limited to the most probable matches. As the user selects an entry from the candidate list, the list review operation 24 identifies the document from which the snippet image comes and retrieves the snippet image for display to the user. Based on actual observation of the snippet or record image, the user may choose to review the actual document 26 containing the snippet or record. In this way, an automated search reduces the number of records and documents that must be manually reviewed by the user or investigator.

For example, if the threshold used by automated search operation 20 in compiling the best match list, i.e. candidate list, is a threshold such that the list contains snippets or records from one percent of the documents scanned, then the manual search workload burden has been reduced by a factor of 100. The user can adjust the best match threshold to raise or lower the percentage of candidate records on best match list 22. The higher the threshold, the greater the reduction in manual search burden. If the threshold passed only 0.1% of the records as best match records, then the workload burden for the manual search is reduced by a factor of 1,000.

In effect, the best match threshold value is setting the search depth for the manual search and that search depth is selectable by the user and would generally be based on what is called a "miss rate." Miss rate refers to the probability of missing a document containing the desired snippet during a manual search. Tests have shown that during a manual search where search time does not exceed seven hours, the miss rate is 1%. Therefore, setting the best match threshold to produce a miss rate no worse than a manual search is a reasonable criteria. The search depth threshold might, for example, be based upon the number of snippets on a candidate list relative to the total number of snippets being searched. Also, the number of expected actual matches in a set of documents is a factor in setting the search depth.

The embodiments of the invention described herein are implemented as logical operations in a computing system. The logical operations are implemented (1) as a sequence of computer implemented steps running on the computing system and (2) as interconnected machine modules within the computing system. The implementation is a matter of choice dependent on the performance requirements of the system implementing the invention. Accordingly, the logical operations making up the embodiments of the invention described herein are referred to variously as operations, steps or modules. Some examples of computing systems that may be used include personal computers offered by IBM Corporation and other manufacturers of IBM compatible personal computers and systems running a DOS, OS2 or Windows operating systems. Additionally, a computing system workstation such as SPARC systems offered by Sun Microsystems or Risk System 6000 offered by IBM Corporation or other systems running the UNIX or similar operating system. In addition, large mainframe computing systems for very large databases might be used.

Figure 2:
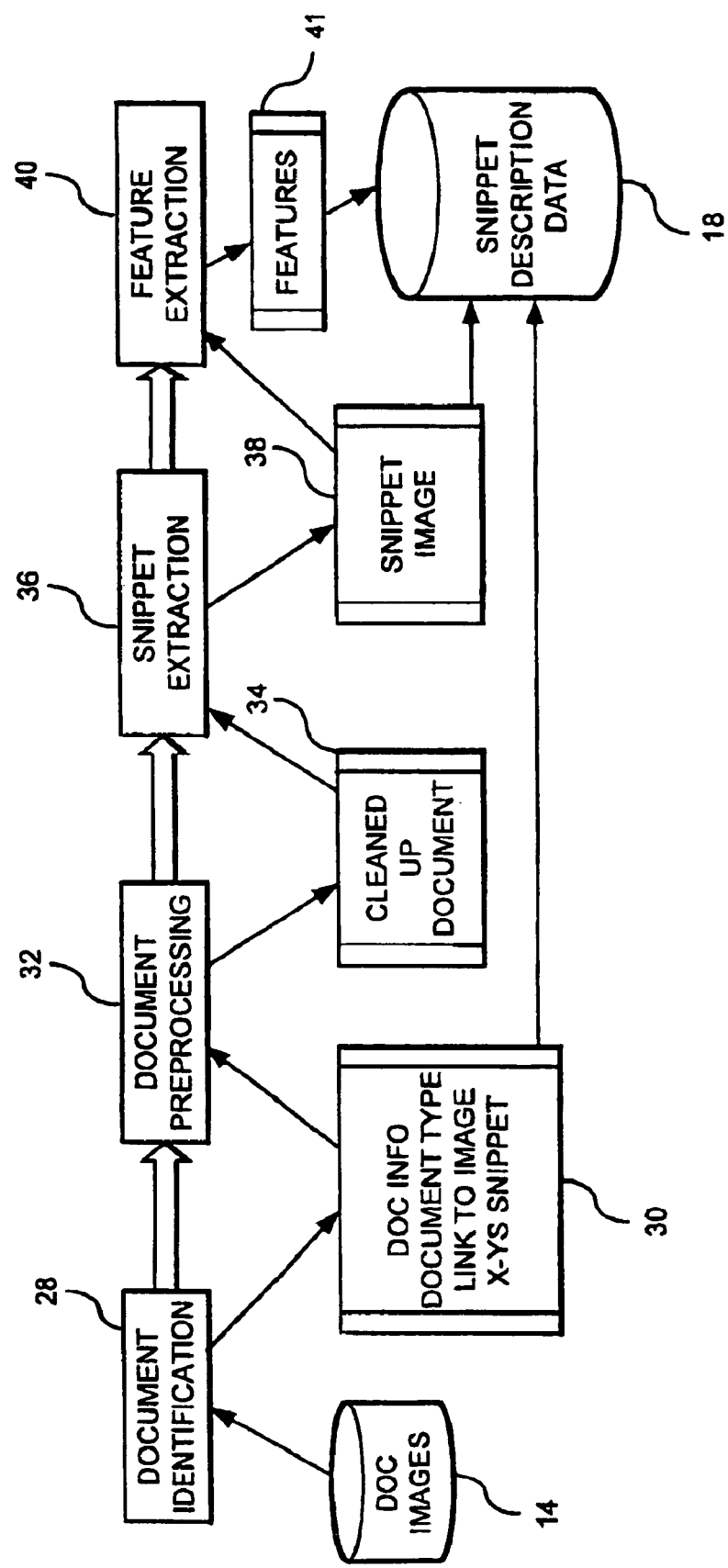
FIG. 2 illustrates the logical operations performed by the extraction operation in FIG. 1.

FIG. 2 illustrates the logical operations performed by the extraction operation 16 of FIG. 1. The document images 14 are retrieved by document identification module 28. The document identification module examines the document image to identify the document type, to locate X,Y position of a snippet on the document and to link each snippet or record image to a document. Module 28 builds this document information 30 for each record on the document. This document information 30 becomes a part of the snippet description data 18 for each snippet or record.

Examples of snippet description data are shown in FIG. 3. A document ID number is generated for the document to link snippet description data to the document from which the snippet comes. Also, a snippet zone for a record is generated to specify the location X,Y and size of the snippet or record image on the document. The dX,dY data in the zone information indicates the dimensions of the record image and accordingly the size of the record image on the document.

Preprocessing logical operation 32 receives the document information 30 and operates to produce a cleaned up document image to facilitate snippet extraction. The preprocessing by logical operation 32 is performed based on the document type. Operation 32 deletes unnecessary information on the document such as tabular lines and printed text to create cleaned up document image data 34. The stored clean document image data 34 is then available for the next logical operation which is snippet extraction.

The snippet or record extraction operation 36 operates to electronically cut a record image out of the document image. This may be accomplished in a number of different ways. In the simplest version, the record X,Y location and dX,dY size may be used to define a boundary for a record image. The record image is then cut from the document image and stored as snippet or record image data 38. A record image might also be extracted by scanning the image of each record on the document and cutting each record from the document based on the detected size of the record from the scanning of the record image.

In an alternative implementation of this embodiment, the preprocessing operation 32 and the snippet or record extraction operation 36 are reversed. When these operations are reversed, a record is extracted based solely on the zone information—the detected X,Y location and dX,dY size of a snippet or record zone by the document identification operation 28. Thereafter, the snippet or record image is cleaned up to eliminate lines or unwanted extraneous marks inside the zone of the snippet image. In either event, a relatively clean record image is stored as snippet image data 38 which is passed on for inclusion in the snippet description data 18.

Feature extraction operation 40 is the last operation performed by extraction module 16 (FIG. 1). In one preferred embodiment, the feature extraction operation 40 is performed as described in U.S. Pat. No. 5,467,407, entitled "Method and Apparatus for Recognizing Cursive Writing from Sequential Input Information", by S. A. Guberman et al. issued Nov. 14, 1995, and incorporated herein by reference. In particular, FIG. 4 of the Guberman patent illustrates the feature extraction process to produce a "metastroke" sequence representation of the snippet image. Metastrokes are cursive strokes or handwriting stroke features that make up a cursive or handwritten character in a record image. An example of extraction of metastroke or cursive stroke features from cursive text is shown in FIGS. 6A and 6B of the Guberman et al patent. The feature extraction operation generates the features data 41. The features data is added to the snippet description data 18 as a sequence of metastroke features for the each snippet.

FIG. 3 illustrates a snippet description data file containing three snippet or record description entries. Each snippet description entry includes cursive character stroke features 42, the snippet or record image 44, and the link to document data 46. The features 42 in this preferred embodiment are the metastroke features for the snippet or record image. Snippet image 44 is the image of the snippet or record extracted by operation 36. The link to document data 46 is the document identifier and zone data of the snippet or record on the document which is produced by the document identification logical operation 28. These snippet description entries in the snippet description data 18 are then ready for processing by the automated search operation 20 (FIG. 1).

Figure 4:
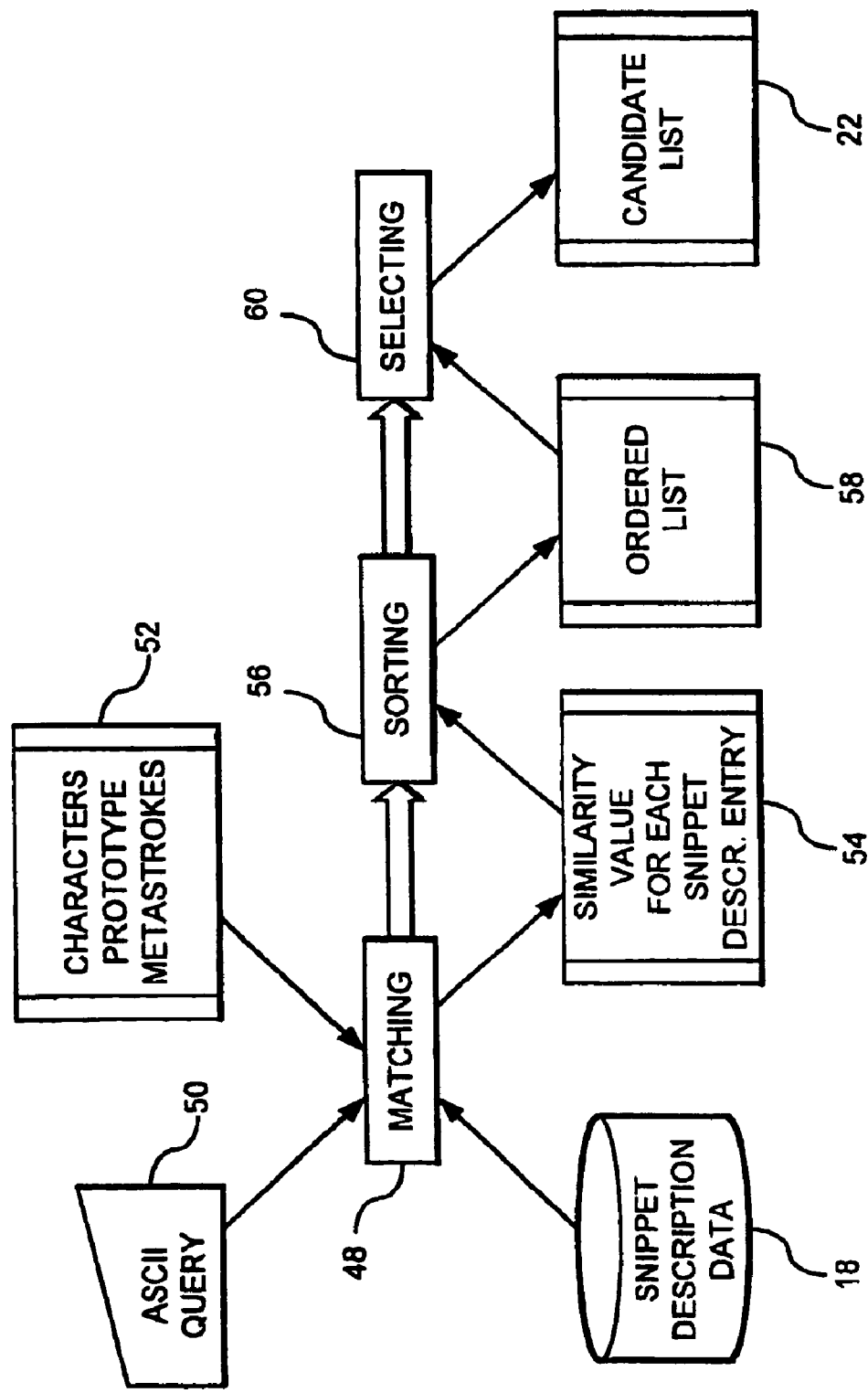
FIG. 4 shows the logical operations performed in conducting the automated search logical operation of FIG. 1.

The automated search operation is detailed in FIG. 4. Matching module 48 is the first logical operation performed in the automated search. Matching module 48 in one preferred embodiment performs the word matching operations described for metastrokes in the Guberman et al patent (see FIGS. 5–14 of Guberman U.S. Pat. No. 5,467,407). The matching or comparing module 48 (FIG. 4 herein) receives each snippet description data entry and attempts to match it against a metastroke version of the computer coded query 50. The computer coded query 50 in one preferred embodiment is a string of ASCII characters. Accordingly, the metastroke feature sequence for each snippet in the snippet description data replaces the whole word metastroke sequence in the Guberman patent. The dictionary in the Guberman et al patent is replaced by the character prototype metastroke feature sequence for the ASCII query. In other words, matching operation 48 converts the ASCII characters in the query 50 to a metastroke sequence or cursive character stroke sequence representative of the cursive or handwritten equivalent search image of the query.

More than one metastroke sequence for the query may be used because of variations in handwriting styles or phonetic variations in the query. In any event, these metastroke sequences for the ASCII query become the dictionary as used in the Guberman patent. The matching or comparing module 48 generates a similarity value for each comparison between metastrokes for a query snippet and metastrokes for each snippet image. This similarity value is computed and corresponds to the maximum combined score for a match of metastroke feature strings or sequences from query and snippet or record. Snippet or record descriptions, including their images, with their similarity values from the matching operation are then saved in file 54 for use by sorting operation 56. For example, matching a query, Nemo Joy, to snippet Naho Joe, might produce a similarity value of 652. The similarity value of 652 is stored with snippet or record description entry Naho Joe for the query Nemo Joy.

Sorting operation 56 sorts each of the snippet or record descriptions by similarity value. This sorting operation produces an ordered list of snippet or record images from most similar to least similar based on similarity value. Ordered list 58 is used by selecting operation 60 to produce a candidate list 22 of record images. Selecting operation 60 sets a threshold value to select from the ordered list 58 only the snippets or records that satisfy or pass the threshold value. The number of snippets placed on the candidate list depends on the threshold. The threshold might be based on a similarity value or it might be based on passing a predetermined number of entries from the ordered list to the candidate list. As discussed earlier, this candidate list is now used in a manual search operation performed by the user or investigator.

In an alternative embodiment of the invention, the sorting and selecting operations might be reversed in sequence or combined. The threshold test for the similarity value in this embodiment would be performed right after the matching operation 48. Only those snippets or records of candidate matches, where the match to the query produces a similarity higher than or otherwise satisfying the threshold, would be placed on the list of snippets or records matching the query. Further, if those snippets are added to the list in order of similarity value, the result is the candidate list 22.

Figure 5:
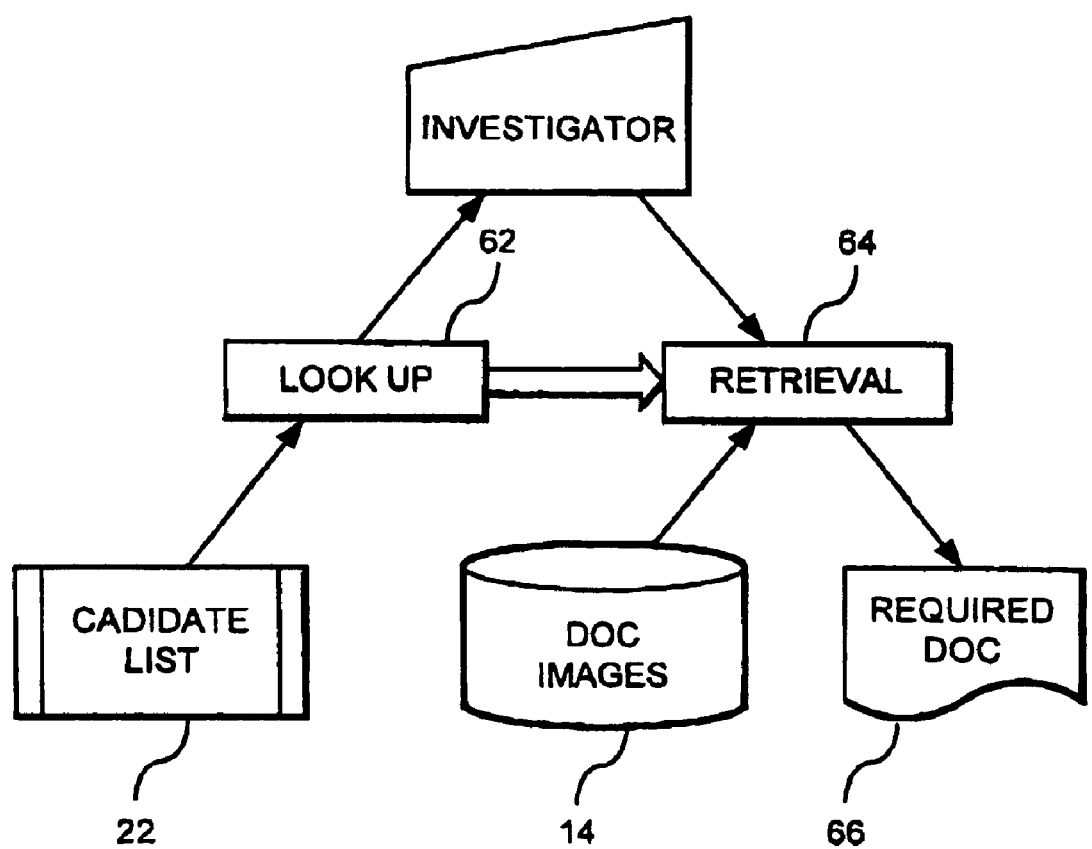
FIG. 5 shows the logical operations performed in the candidate list review operation 24 of FIG. 1.

In FIG. 5, the user/investigator interacts with the system to perform list review operation 24 of FIG. 1. Look up operation 62 pulls snippets off the candidate list 22 and displays the snippet image to the investigator. The snippet images from the candidate list are pulled and displayed in order of highest similarity value first. As each snippet image is displayed, the investigator may elect to retrieve the document image for the document containing that snippet image. Retrieval operation 64 retrieves the document image based upon the document identifier in the snippet description entry pulled up by the look up operation 62. After the investigator reviews the full document image as retrieved by retrieval operation 64, the investigator makes a decision to retrieve or not retrieve the actual physical document 66 containing the snippet. If the investigator believes the snippet is a match for the query, the investigator retrieves document 66 for examination of the actual record.

In another preferred embodiment of the invention, recognition techniques are added to the extraction operation 16 (FIG. 1). These additional recognition operations during extraction are used to provide a quick list of possible recognition answers for each snippet image, and a list of ASCII recognition answers for each snippet is loaded with the snippet description data 18. These additional lists of possible recognition answers for snippets are used in the automated search operation shown in FIG. 8, described hereinafter, to more rapidly locate documents for manual review by an investigator.

Figure 6:
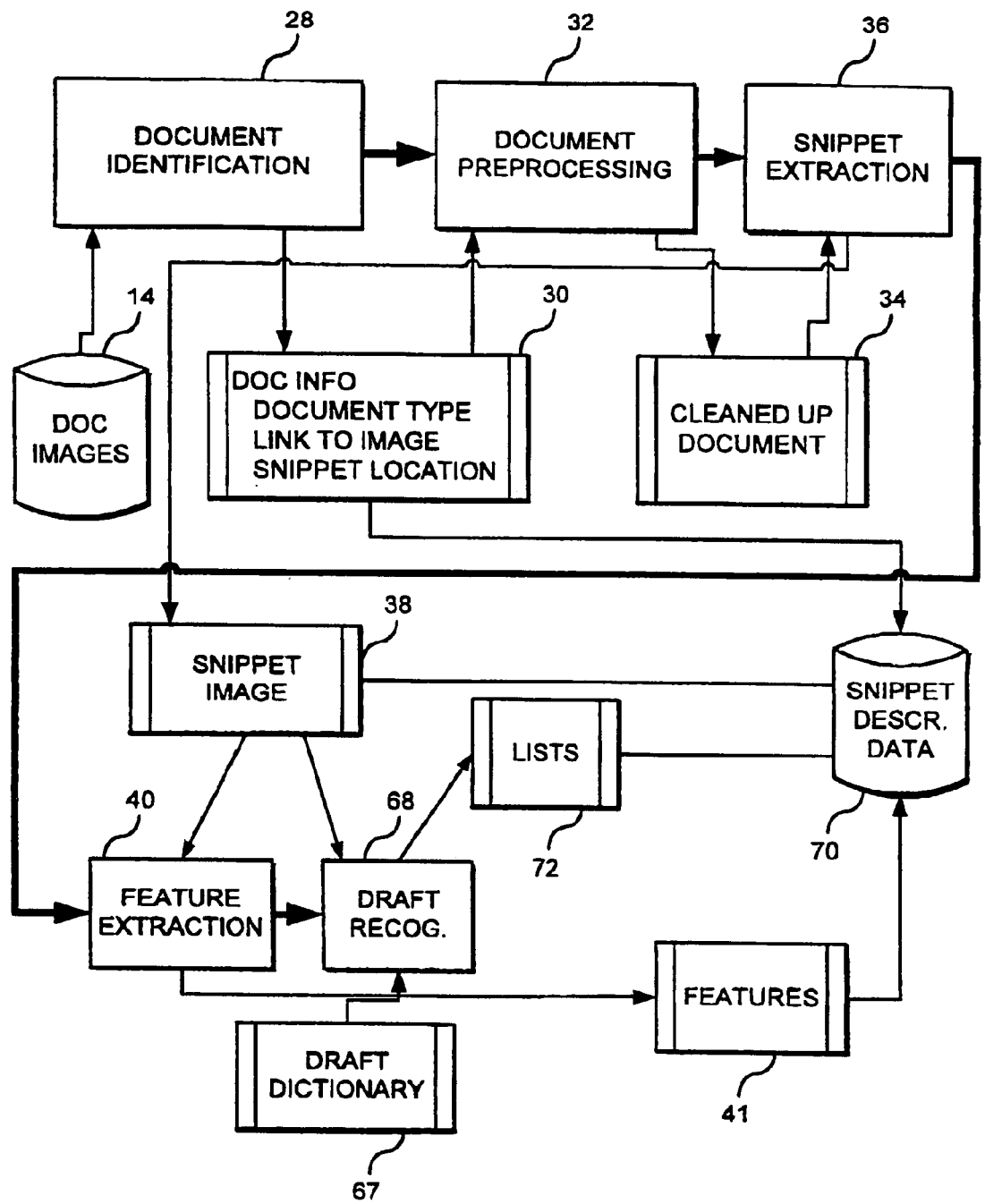
FIG. 6 shows another embodiment where recognition techniques are added to the extraction operation 16 of FIG. 1.

In FIG. 6, the extraction module for the alternative embodiment using recognition during extraction is shown. Operations and stored data that are unchanged from the embodiment in FIG. 2 have been given the same reference numerals in FIG. 6 and should be understood to operate in the same manner as described in reference to FIG. 2. The new operations and new data in FIG. 6 make use of a draft recognition module 68. The draft recognition module receives the snippet image 38 and attempts to recognize that snippet image based on reference information in a draft dictionary 67. "Draft" in reference to the recognition module 68 and dictionary 67 refers to the fact that the dictionary contains a limited set of references which are the most common or most likely matches for the type of snippets being searched.

The contents of draft dictionary 67 includes ASCII characters and character features for the ASCII characters where the features depend upon the type of recognition operation being performed by draft recognition module 68. If the recognition module 68 uses the techniques in the Guberman patent, then the dictionary contains ASCII characters and metastroke features of the ASCII characters for common character combinations for the snippets. For example, the expected characters in the draft dictionary when working with census records would be a list of most common names.

The draft dictionary 67 is used by the draft recognition operation 68 to attempt to recognize the snippet. As the comparison from features of the snippet image to features of an entry in the draft dictionary is made, a similarity value for that draft dictionary version of the snippet is determined. The draft dictionary ASCII form of the snippet used in the comparison is loaded as an answer "A" in to list 72 along with the similarity value "S." For example, let us assume that the snippet is "Bird John" as in the third row of FIG. 3. Let us also assume that in the draft dictionary "Bird John" is a reference, "Beard Joe" is a reference, and "Bard Joan" is a reference. As the stroke features of snippet Bird John are compared to stroke features for ASCII references—Bird John, Beard Joe, and Bard Joan from the draft dictionary, a similarity value will be generated for each comparison by draft recognition operation 68. The response for each comparison will be a reference answer A in ASCII from the draft dictionary along with a similarity value S produced by the recognition process. Thus, the list would, for example, contain Bird John (ASCII), 875; Beard Joe (ASCII), 522; and Bard Joan (ASCII), 658. This list of recognition answers and similarity values is added to the snippet description data 70 in FIG. 6. Now the snippet description data 70 includes for each snippet—image data 38, a list of possible recognition answer pairs 72 in ASCII, the features 41, and the document linking information 30.

Figures 7, 10:
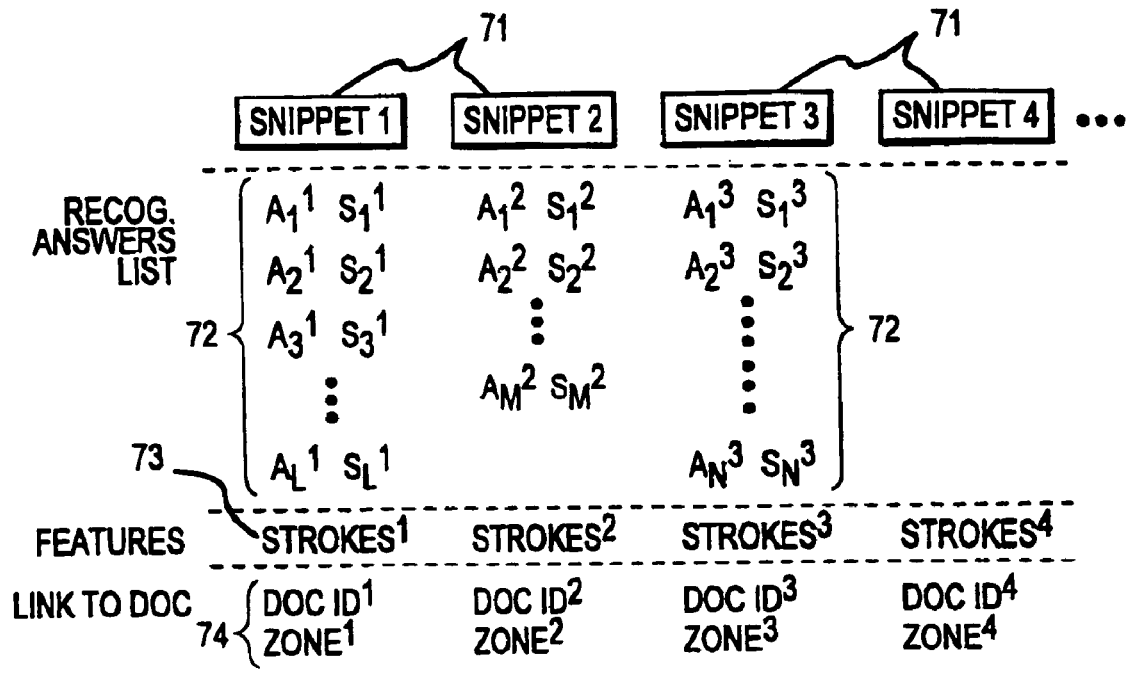
FIG. 7 illustrates the snippet description data that is processed in the operations of FIGS. 6 and 8.
FIG. 10 shows an example of a first choice list used in the automated search operation of FIG. 8.
Figure 8:
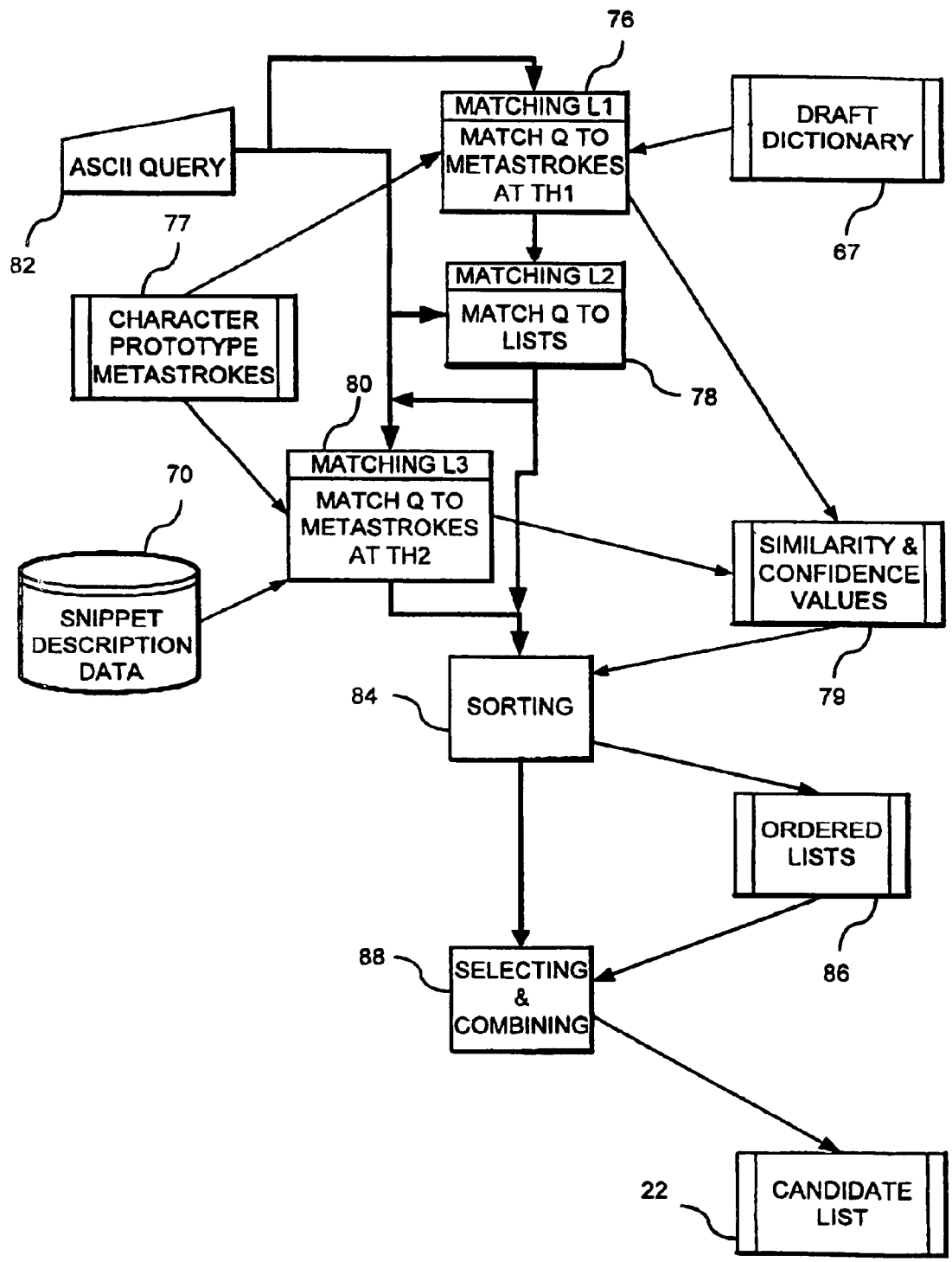
FIG. 8 shows the automated search operation in another embodiment of the invention that makes use of the ASCII recognition answers as well as the automated search operations in FIG. 4.

In FIG. 7 the snippet description data 70 for the preferred embodiment of FIGS. 6 and 8 is illustrated. Each snippet image 71 has associated with it a list 72 of recognition answer pairs, feature information 73 and document information 74. The feature information 73, snippet image 71 and document information 74 are the same as previously described elements 42, 44 and 46 respectively of FIG. 3. The list 72 for each snippet is new information from the draft recognition module 68. Each entry in the list is a recognition answer "$A^n_m$" in ASCII and a similarity value "$S^n_m$" as in the above example "Bird John, 875". There is no list 72 for SNIPPET4 to illustrate that not all snippet images will have possible matches in the draft dictionary. Accordingly, SNIPPET4 only has STROKES$^4$ for use by the matching modules in FIG. 8.

In addition to the draft dictionary and draft recognition operation, one might also use a trigram filter to eliminate some of the possible choices by the draft recognition operation 68. For example, in a series of three characters, certain combination of characters are highly unlikely. A triple F is not likely to occur in a name, nor is XYZ. Such unlikely combination of letters may be used to reduce the number of draft recognition comparisons performed by operation 68. Also, other cursive recognition techniques might be used rather than the Guberman technique. Some examples include the recognition techniques taught by Polyakov et al in U.S. Pat. No. 5,473,742, Method and Apparatus for Representing Image Data Using Polynomial Approximation Method and Iterative Transformation—Reparametrization Technique.

The automated search operation in the embodiment of FIG. 8 for the invention makes use of the ASCII recognition answers as well as the automated search operations in FIG. 4. There are a plurality of matching operations 76, 78 and 80 in FIG. 8 some of which are ASCII code comparisons and others are character feature comparison operations. The matching operations are performed at separate levels of the automated search operation, and further, the matching operations may be different operations or different combinations of operations at the separate levels. The levels of operation are dependent upon (1) the query Q, (2) the contents of the draft dictionary 67, and (3) the contents of the lists 72 in the snippet description data 70. By making use of the lists 72 and the draft dictionary 67, the matching operations are focused on the optimum possibility for a fast ASCII match to the query. Therefore the automated search routine overall in FIG. 8 operates more rapidly than the automated search routine in FIG. 4. In effect, more preprocessing has been done by performing the draft recognition in FIG. 6 to generate the lists 72, and now the automated search can be done more rapidly working with ASCII and then reverting to character feature matching only when necessary.

In FIG. 8, a query Q is entered at key entry 82. The query is provided to each of the matching operations 76, 78 and 80. Matching operation 76 at level L1 first tests whether the query is in the draft dictionary by performing an ASCII compare between Q and the draft dictionary 67. If Q is in the draft dictionary, then an answer pair for Q should already be in snippet lists 72. If Q is not in the draft dictionary, matching operation 76 will then perform a character features recognition operation against snippet description data just as in matching operation 48 in FIG. 4. In the preferred embodiment this is a Guberman recognition operation using metastrokes and producing similarity values.

When Q is in the draft dictionary, operation 78 is effective to do an ASCII compare between the query and entries in the snippet lists 72. This produces a first choice list and a "2+" list. These lists are sorted by sorting operation 84 and arranged in ordered lists 86 by similarity value or confidence value. The first choice list, shown in FIG. 10, is a list of answer pairs that match Q and were the first choice entry (highest similarity value) in the snippet list they were listed in. The 2+ list is a list of answer pairs that match Q and were in snippet lists 72 but were not the first choice entry in a snippet list 72.

If Q does match at least one first choice entry or a 2+ entry, then selecting operation 88 combines the first choice entry list and the 2+ entry list to provide the candidate list 22. If Q does not match an entry in the snippet lists 72, then operation 80 matches Q to the snippet metastrokes at a threshold TH2 lower than the previous threshold TH1 used in operation 76. Matching operation 80 at level three represents a last try for a match in the situation where previous recognition or matching operations have not produced a snippet match for Q. In effect matching operation 80 in combination with sorting operation 84 and selecting operation 88 operate in the same manner as previously described for the modules in FIG. 4.

Figure 9:
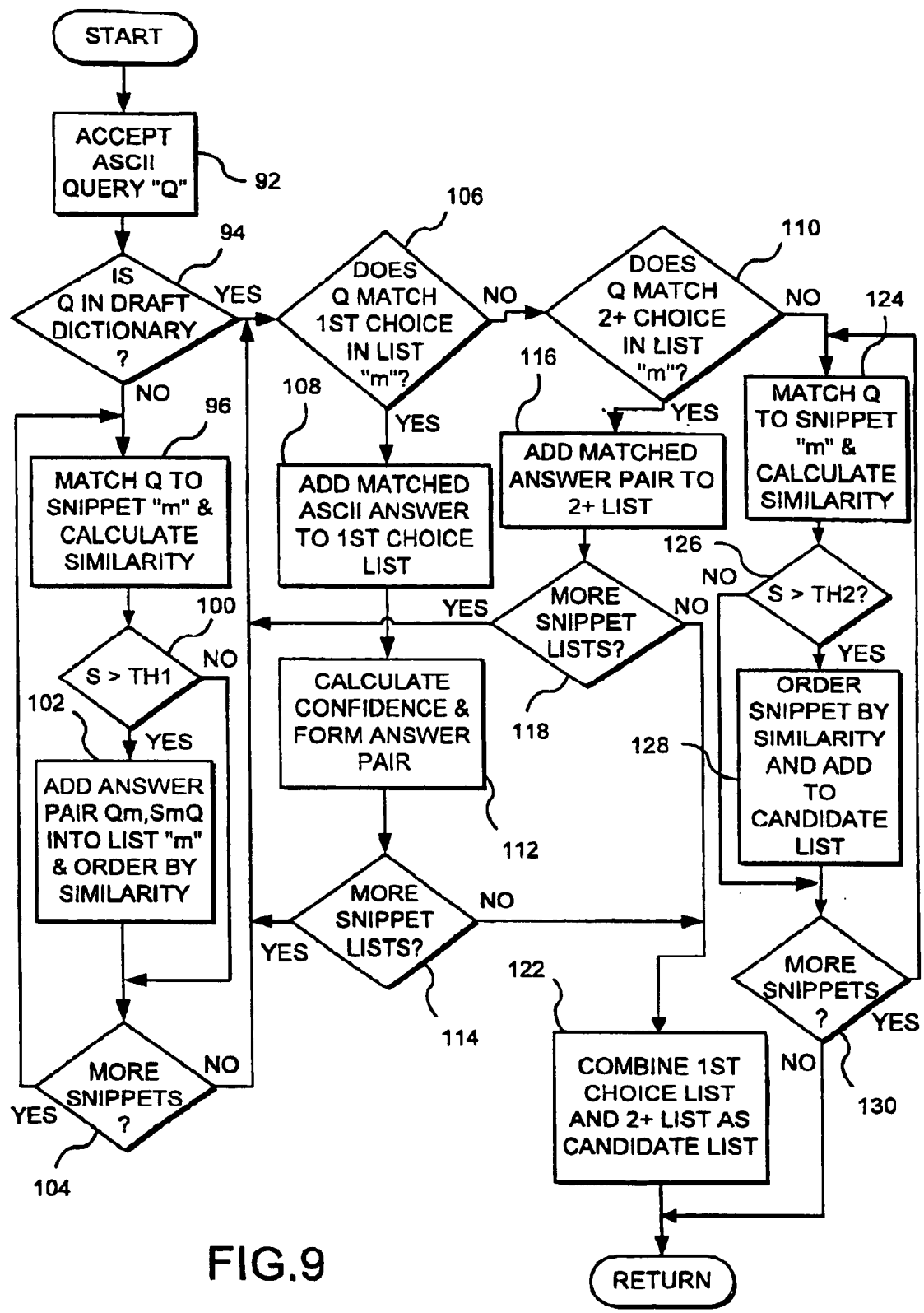
FIG. 9 shows the operations in the automated search modules in FIG. 8 in more detail as an operation flow diagram.

The operations in the automated search modules in FIG. 8 are illustrated in detail as an operation flow in FIG. 9. The automated search operation begins at operation 92 which receives the ASCII query "Q" keyed in keyboard 82 by the investigator. The query, for example—the name of a person, is in the form of ASCII characters. Decision operation 94 does a ASCII compare to detect whether the query Q is in the draft dictionary 67. If the query is not in the draft dictionary, then there is no possible match on the lists 72 generated in FIG. 6 and now stored with the snippet description data 70 in FIG. 7. In this event, the logical operation flow branches NO to operation 96 which is a character features type of recognition operation such as the Guberman technique. If the answer is YES, then the logical operation flow branches to decision operation 106. Operation 106 is an ASCII compare to detect whether the query Q matches a "first choice" in a list 72 stored with the snippets 71 in the snippet description data 70. About 80–90 percent of the queries will likely show up in the draft dictionary. This, of course, depends on the size of the draft dictionary 67 and the number of common names placed into the dictionary. The remaining 10–20 percent of the queries will be processed by recognition operation 96 using the operations described in the Guberman patent.

Operation 96 begins by converting the ASCII query into metastroke sequences. There will be a plurality of metastroke sequences for each query. These sequence variations will reflect alternative common metastrokes for the characters in the query and also will reflect alternative phonetic spellings for the query. Operation 96 will produce a match between the query and each snippet; it will also calculate a similarity value for each match. Decision operation 100 tests whether the similarity value for a match exceeds threshold TH1. TH1 is a threshold selected as described above for FIG. 4 to provide a desired search depth at an acceptable miss rate. If the similarity value does not exceed the threshold TH1, the operation flow branches NO to decision operation 104 to test for more snippets. If the similarity value exceeds the threshold TH1, the operation flow branches YES to ordering operation 102 to add the ASCII form of the query $Q_m$ with its similarity value $S^Q_m$ into the answer pair list 72 for the snippet "m" to which Q was compared. The answer pair $Q_m, S^Q_m$ is placed in ordered position in list "m" according to its similarity value. After the ordering operation 102, decision operation 104 detects whether there are more snippets to match against the query Q. The result of operations 96, 100, 102 is to add more answer pairs to existing ordered lists 72 of answer pairs for snippets and to add possible answer pairs for snippets such as SNIPPET4 that are not in the draft dictionary.

As discussed above, decision operation 106 is looking at one of the recognition answer lists 72 for a snippet to ASCII match the query Q against the first answer pair on the list for that snippet. If there is a match, the operation flow branches YES to decision operation 108. If there is no match between the query Q and the answer pair with the highest similarity on the list, then the operation flow branches NO to decision operation 110. In effect, decision operation 106 is picking out first choice answers in lists 72.

Operation 108, when there is a first choice match, adds the matched answer pair to a "1$^{st}$ Choice" list. Operation 112 calculates a confidence value and adds the confidence value to the first choice answer to form an answer pair in the 1$^{st}$ Choice list. The confidence value is an indicator of the difference in similarity values between the 1$^{st}$ choice answer pair and the next answer pair in the ordered list 72 for the snippet. For example, if the matching 1$^{st}$ choice answer pair has a similarity value of 905 and the second answer pair in the same list 72 has a similarity value of 630, then the confidence value is 275, the difference between the similarity values. After the confidence value is determined and added to the 1$^{st}$ choice answer placed in the 1$^{st}$ Choice list, decision operation 114 tests whether there are more snippet lists 72 to match Q against the 1$^{st}$ choice in the snippet list. If the answer is YES, the operation flow returns to decision operation 106. If there are no more snippet lists 72, the operation flow branches NO to combine operation 122. In effect the last snippet list produced a 1$^{st}$ choice match and all lists have been checked for 1$^{st}$ choice or 2+ choice entries. Therefore the operation flow branches YES from decision operation 114 to combine operation 122.

If there is no match between Q and the 1$^{st}$ choice in the snippet list, the operation flow branches NO from decision operation 106 to decision operation 110. Operation 110 is performing an ASCII compare to detect whether Q matches an answer in the snippet list other than the answer with the highest similarity value. In effect operation 110 is looking for a matched answer pair other than the 1$^{st}$ choice in the list after operation 106 has found that the 1$^{st}$ choice in the list was not an ASCII match to Q. If operation 110 detects a match, the operation flow branches YES to operation 116 to add the matched answer pair from a snippet list 72 to a "2+ Choice" list. After the matched answer pair is added to the 2+ Choice list, decision operation 118 detects whether there are more snippet lists against which Q can be compared. If there are more snippet lists, the operation flow branches YES from operation 118 and returns to decision operation 108 to begin matching Q against the next snippet "m" list. The result of operation loops branching YES from decision operation 106 and from decision operation 110 is to build 1$^{st}$ Choice and 2+ Choice lists from ASCII matches between Q and answer pairs in the snippet lists 72. When there are no more snippet lists after a positive 1$^{st}$ choice compare in operation 106 or a positive 2+ choice compare in operation 110, the operation flow branches NO from decision operation 114 and decision operation 118, respectively, to combine operation 122.

Operation 122 combines the contents of the 1$^{st}$ Choice list and the 2+ Choice list into a candidate list 22. The 1$^{st}$ Choice list entries are ordered by confidence value and are placed first in the candidate list. The 2+ Choice list entries are ordered by similarity value and are placed after the 1$^{st}$ Choice entries in the candidate list. The candidate list 22 is used by the investigator to retrieve documents of interest using the operations of FIG. 5 described above.

The power of this alternative embodiment of the invention should now be apparent. In particular, operations 94, 106 and 110 are all ASCII compare operations. Accordingly, positive responses to these ASCII compare operations leads to generation of a candidate list without having to go through the more time-consuming character feature matching operations 96 or 124.

Matching operation 124 is the same as matching operation 96, but is only invoked as a last try if the query Q goes through ASCII matching operations 106 and 110 with out finding a match for Q on snippet lists 72. Further, if Q was not in the draft dictionary than character feature matching operation 96 is invoked. However, if all of the matches by operation 96 produce similarity values below TH1, than no Q answer pair will be added to snippet lists 72. Accordingly, Q might pass through ASCII matching tests 106 110 and still produce negative results. In that event a last try for snippet matches by operation 124 is desireable.

Matching operation 124 is the same type of matching operation as in operation 96; however, the output similarity value for a possible answer pair is tested by decision operation 126 against a threshold TH2. Threshold TH2 is set lower than threshold TH1 at operation 100. In effect matching operation 124 and compare operation 126 are a last attempt to find a lower quality match when all the previous recognition efforts have not produced matches for a candidate list.

In one embodiment TH2 might be set to the same threshold used with the operations in FIG. 4. In such an embodiment, TH1 would be at a higher threshold than the standard threshold used in FIG. 4 in an effort to quickly build $1^{st}$ Choice and 2+ Choice lists of high similarity values. In this embodiment the standard threshold would not be used if a candidate list can be built with $1^{st}$ Choice and 2+ Choice lists. In another embodiment TH1 might be set to the standard threshold and TH2 would be lower than the standard threshold. Of course any number of threshold combinations might be used to produce an optimum combination for accelerating the automated search.

If the similarity value does not exceed threshold TH2, the operation flow branches NO from decision operation 126 to decision operation 130. Decision operation 130 is detecting whether there are more snippets to match against Q. If there are more snippets, then the operation flow returns to matching operation 124 to match Q against the next snippet.

If the similarity value does exceed threshold TH2, the operation flow branches to order operation 128. Operation 128 adds the snippet to the candidate list and orders the snippet in the list according to its similarity value from highest to lowest in value. After operation 128, if operation 130 detects no more snippets, the operation flow returns to the main process. The last operation is to review the candidate list as already described in reference to FIG. 5.

While the invention has been particularly shown and described with reference to preferred embodiments thereof, it will be understood by those skilled in the art that various other changes in the form and details may be made therein without departing from the spirit and scope of the invention.

What is claimed is:

1. A method for finding a desired handwritten computer record using automated searching by a computing system comprising:

extracting a snippet of each handwritten computer record and identifying each snippet with an associated handwritten computer record;

automated searching of the snippets by the computing system to select best matches between a query and snippets extracted by the extracting act, the best matches forming a candidate list; and displaying the candidate list of snippets that match the query close enough to warrant display of the associated handwritten computer records whereby the number of handwritten computer records, that must be displayed to find the desired handwritten computer record, are reduced.

2. The method of claim 1 wherein the act of extracting comprises:

identifying a source handwritten computer record;

extracting the snippet out of the source handwritten computer record; and storing the snippet and an identification of its source handwritten computer record in snippet description data.

3. The method of claim 2 wherein the act of automated searching comprises:

matching a query against each snippet and generating a similarity value indicative of how well the query matches the snippet;

sorting query matches by similarity value; and selecting query matches with the similarity values above a certain value to create a candidate list of best matches.

4. The method of claim 3 wherein the act of displaying comprises:

looking up snippets on the candidate list; and retrieving source handwritten computer records for snippets on the candidate list that best match the query.

5. A computer search method for performing an automated search of handwritten computer records, the search method comprising:

extracting handwritten record phrases from a handwritten computer record;

converting a query into a plurality of handwritten variations for characters in the query to generate a plurality of handwritten search features associated with the query;

matching the handwritten search features against features of the handwritten record phrases in the handwritten computer record and generating a similarity value for each handwritten record phrase as a measure of similarity between the features of the handwritten record phrase and the handwritten search features associated with the query;

selecting handwritten record phrases based on their similarity values to create a candidate list of handwritten record phrases as possible candidate matches for the query; and displaying the candidate list of handwritten record phrases.

6. The search method of claim 5 wherein handwritten search features are a sequence of handwritten character stroke features and each sequence is a variation from other sequences of handwritten character stroke features for the query due to variations in handwriting styles and phonetic variations in the query.

7. The search method of claim 5 wherein the act of selecting handwritten record phrases comprises:

sorting the handwritten record phrases into an ordered list according to similarity value;

setting a threshold value;

selecting for the candidate list the handwritten record phrases having a similarity value that satisfies the threshold value.

8. The search method of claim 5 wherein the act of selecting handwritten record phrases comprises:

sorting the handwritten record phrases into an ordered list according to similarity value from most similar record phrase to least similar record phrase;

selecting a predetermined number of the most similar handwritten record phrases from the ordered list for the candidate list.

* * * * *